United States Patent [19]

Blanding

[11] Patent Number: 5,529,232

[45] Date of Patent: Jun. 25, 1996

[54] PRECISION PIN REGISTERED FILM GATE

[75] Inventor: Douglass L. Blanding, Rochester, N.Y.

[73] Assignee: Eastman Kodak Company, Rochester, N.Y.

[21] Appl. No.: 292,987

[22] Filed: Aug. 19, 1994

[51] Int. Cl.⁶ .............................. G03B 1/22; B65H 23/04
[52] U.S. Cl. .............................. 226/58; 226/55; 352/194
[58] Field of Search .............................. 226/2, 3, 54–59, 226/74, 75, 81; 352/225, 194; 355/75, 76

[56] References Cited

U.S. PATENT DOCUMENTS

| | | | |
|---|---|---|---|
| 1,805,948 | 5/1931 | Lane | 355/90 |
| 2,418,943 | 4/1947 | Jones | 352/221 |
| 2,619,006 | 11/1952 | Debrie | 226/57 |
| 2,986,316 | 5/1961 | Petersen | 226/57 |
| 3,776,626 | 12/1973 | Lewis | 226/55 X |
| 4,161,365 | 7/1979 | Anderson et al. | 355/75 |
| 4,575,226 | 3/1986 | Zahn et al. | 355/43 |
| 4,702,577 | 10/1987 | Weigert | 226/55 X |
| 5,328,073 | 7/1994 | Blanding et al. | 226/27 |

*Primary Examiner*—Daniel P. Stodola
*Attorney, Agent, or Firm*—Nelson Adrian Blish

[57] ABSTRACT

A film registration and gate assembly has a gate with focal positioning location for focal positioning of an image frame of a strip with edge perforations. Undersized first and second pins enter a pair of transversely aligned perforations of the film to register the image frame within the positioning location. A second pair of undersized pins transversely aligned perforations positioned along the filmstrip from the first pair of pins perforations entered by the first and second pair of pins. The first pair of registration pins provides constraint to the film in three degrees of freedom. The second pair of pins is spring-loaded to provide the nesting forces needed to ensure proper contact between the film and the pair of registration pins and the force required to assure that the film follows the contour of the gate's surface.

9 Claims, 11 Drawing Sheets

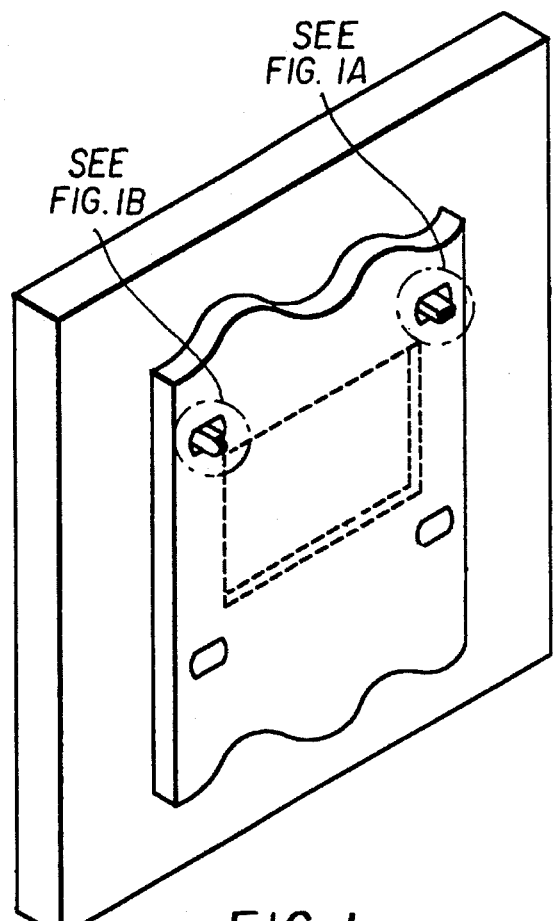
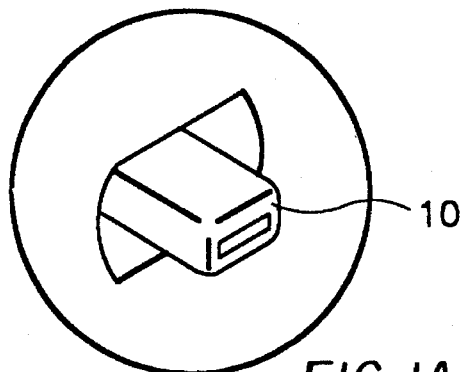
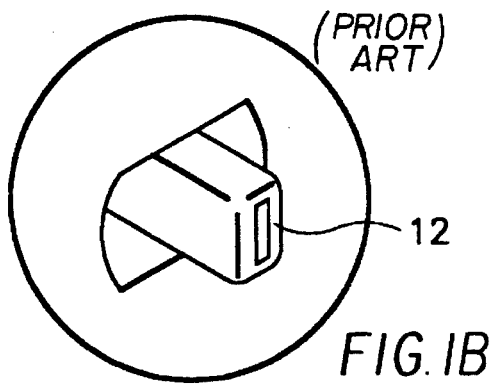
FIG. 1
(PRIOR ART)
FIG. 1A
(PRIOR ART)
FIG. 1B
(PRIOR ART)

PRECISION PIN REGISTERED FILM GATE

FIELD OF THE INVENTION

This invention relates to a film registration gate assembly for stripfilm with edge perforations to be used to precisely and repeatably position the perforated film, in the film gate of a projector, digital scanner or writer, telecine, or other apparatus requiring precise, repeatable film location.

BACKGROUND OF THE INVENTION

Movie projectors have used pin registered film gates for many years. Cinema projectors typically use a pair of registration pins such as those shown in FIG. 1 (from the paper "Pin Registration" by A. C. Robertson, Journal of the SMPTE, Vol. 72, February 1963, pp. 75–81). The dimensions of the "big pin" 10 are closely matched to the dimensions of the perforation. Big pin 10 is intended to be "full-fitting" with respect to the perforation, and thus prevent motion of the film in two degrees of freedom. The "little pin" 12 is full-fitting only in the film's "in-track" direction, thus constraining the film's third degree of freedom. Unfortunately, it is impossible to have a perfect match between the pin dimensions and the perforation dimensions, so the pins either fit too tight (producing wear of the pins and damage to the perforations) or too loose (resulting in "play" and imprecise film positioning). This latter problem manifests itself as image motion on the movie screen. This small amount of motion, while detectable, has long been considered acceptable. Recently, however, owing to the increased use of special effects, where several images are superimposed to form a composite image, there is now a need to be able to very precisely and repeatably reposition the film in the gate so that each of these images will be properly aligned without variation.

In U.S. Ser. No. 903,837, an improved pin registered film gate was disclosed. In this disclosure, neither of the registration pins was full-fitting with respect to its perforations. Instead, the two pins (considerably undersize relative to their perforations), were inserted into the perforations and a nesting force was then subsequently applied to cause the film to move so that the edges of the perforations would become nested against the pins. The position and angle of the nesting force was shown to be equal to the vector sum of the three individual forces occurring at the three points of contact between the two registration pins and the perforations. This pin registration technique overcame the problem of imprecision of conventional pin registered film gates which tried to achieve "perfect" match between the dimensions of the pins and those of the perforations.

U.S. Ser. No. 903,689 has disclosed a similar means of accomplishing pin registration except that the nesting force is applied by a spring-loaded pin which is inserted into a third perforation simultaneously with the insertion of the registration pins. Also, the design and operation of a film clamp is described. This film clamp operates by pressing the film against the cylindrical surface of the gate, starting first at the area of the film adjacent to the registration pins, then "ironing out" the film by progressively wrapping the clamp around the cylindrical gate. This progressive wrapping action, while suitable for slow speed operation, would be far too time consuming for a gate which is to operate at several frames per second.

The present invention is intended to achieve the same high degree of precision achieved by the pin registration means of U.S. Ser. No. 903,837 and U.S. Ser. No. 903,689, but without making the same sacrifice in speed of operation.

SUMMARY OF THE INVENTION

The invention provides a method and apparatus of pin registration for perforated film, which is superior to conventional pin registration techniques in terms of precision and repeatability, and which obviates the clamp usually needed to assure that the film follows the contour of the gate surface. The apparatus includes a pair of registration pins and a pair of spring-loaded pins, the registration pins providing constraint to the film in three degrees of freedom and said spring-loaded pins providing both the nesting forces needed to insure proper contact between the film and registration pins and the force needed to assure that the film follows the contour of the gate surface.

The present invention provides a film registration assembly for positioning an image on a filmstrip within a film gate, said film having edge perforations along both edges of the film, said assembly comprising a first pair of pins movable between an inactive position and an active position wherein said pins enter at least one perforation on each edge of the filmstrip and at least one pin is fixed while in its active position wherein the pins enter at least one perforation on each edge of the filmstrip and at least one pin is fixed while in its active position to provide a reference for the filmstrip when the filmstrip engages one pin. There is a second pair of pins movable between an inactive position and an posi- tion wherein said other pins engage edge perforations on each edge of the filmstrip. A first force applying means associated with said first pair of pins for applying a force to at least one pin of said first pair on the opposite edge of the filmstrip from said fixed pin in a direction lateral to said filmstrip such that the outermost edge of the perforation engages said fixed pin; and a second force applying means associated with said second pair of pins for applying a force to at least one of said second pair of pins on each edge of the filmstrip in a direction longitudinal to the filmstrip and away from said first pair of pins.

BRIEF DESCRIPTION OF THE DRAWINGS

Other features and advantages will become apparent upon reference to the following description of the preferred embodiment when read in light of the attached drawings.

FIGS. 1, 1A and 1B are schematic drawings of the conventional means of pin registration employing a "big" pin and "little" pin;

DETAILED DESCRIPTION OF THE INVENTION

Figure 2:
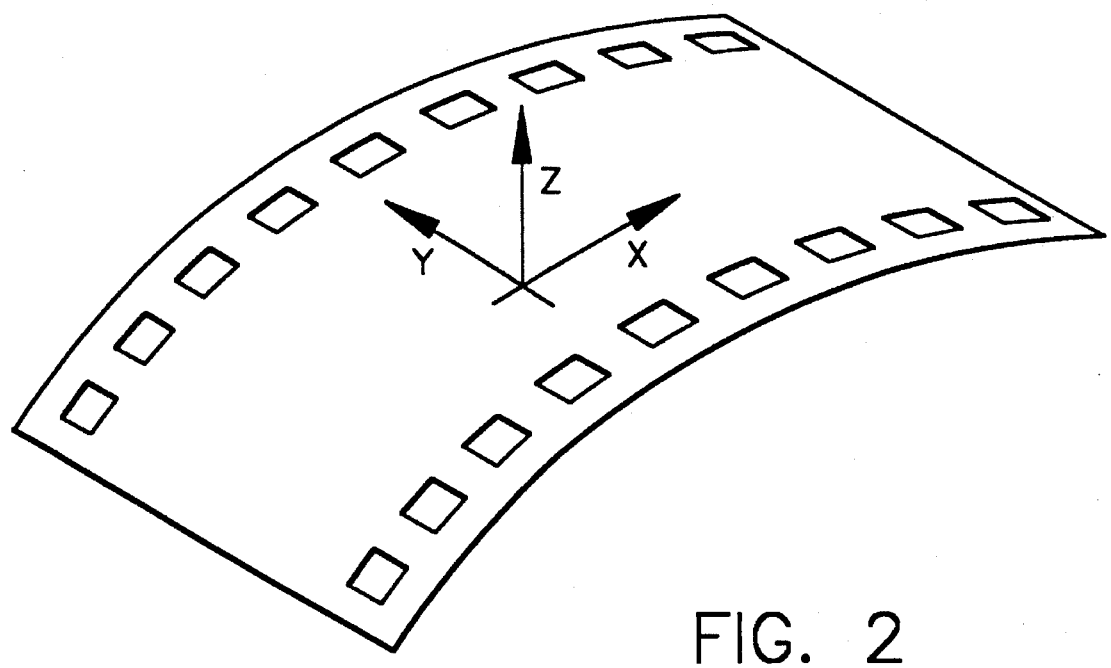
FIG. 2 shows the reference coordinate system used with the film, which is wrapped around a cylindrical surface.

This pin registration process has been conceived to operate with film which is wrapped around a circular cylinder having a 2" radius, but it could be conceived to work with film on a surface of different shape and size. It will be helpful to define a coordinate system in relation to the film which is positioned in the film gate. Referring to FIG. 2, the X-direction is taken to be in the direction of film motion (in-track) which, in cylindrical terms, is the tangential direction. The Y-direction (film cross-track) is parallel to the cylinder axis. The Z-direction (perpendicular to the film surface) is radial with respect to the cylinder.

FIGS. 3 through 7 are schematic views of the pins of this invention in relation to the film perforations, as viewed along the Z-axis. The motions of the pins are shown in sequence.

Figure 3:
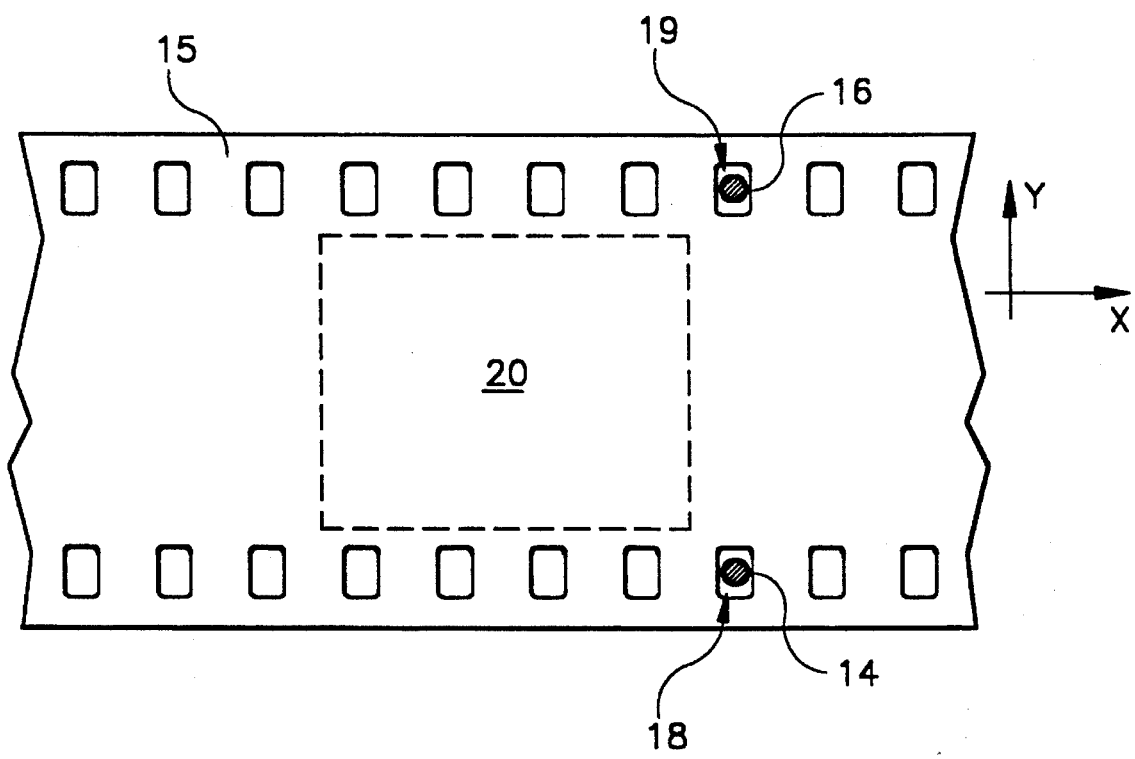
FIG. 3 shows the positions of the pins R1 and R2 upon insertion into their perforations in the film.
Figure 4:
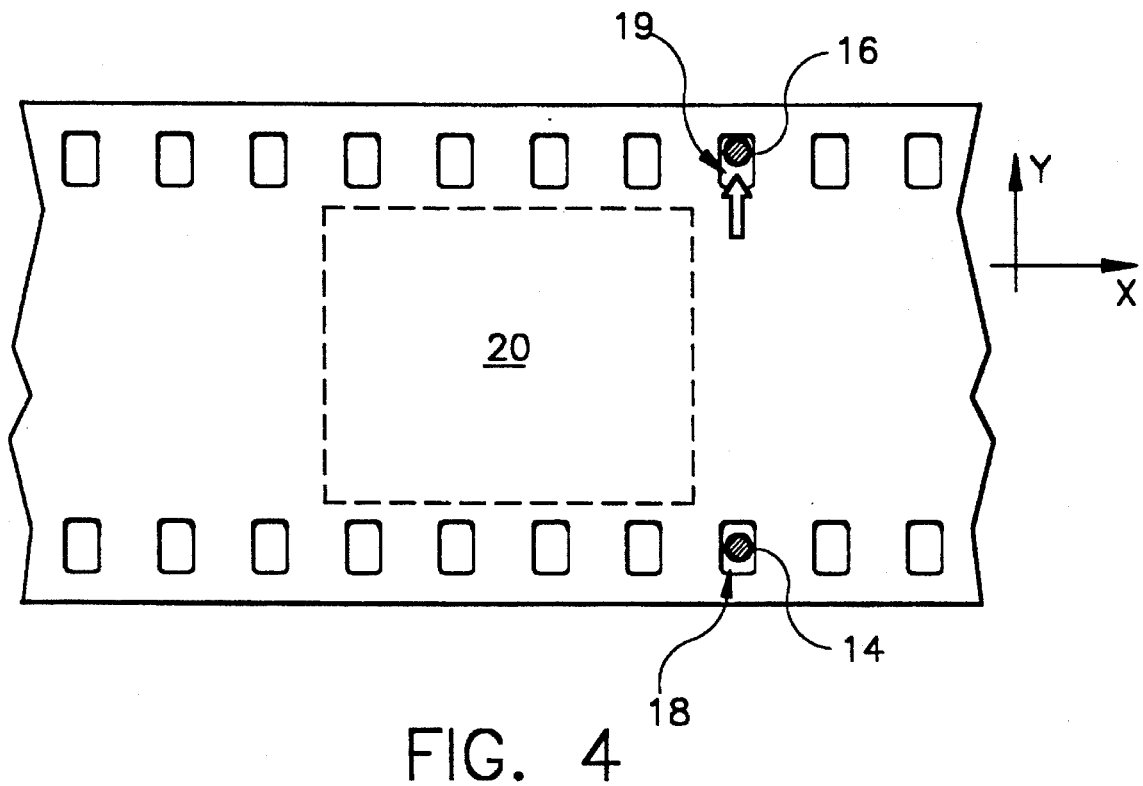
FIG. 4 shows the positions of the pins R1 and R2 at an intermediate point during the travel of the R2 pin in the Y-direction.
Figure 5:
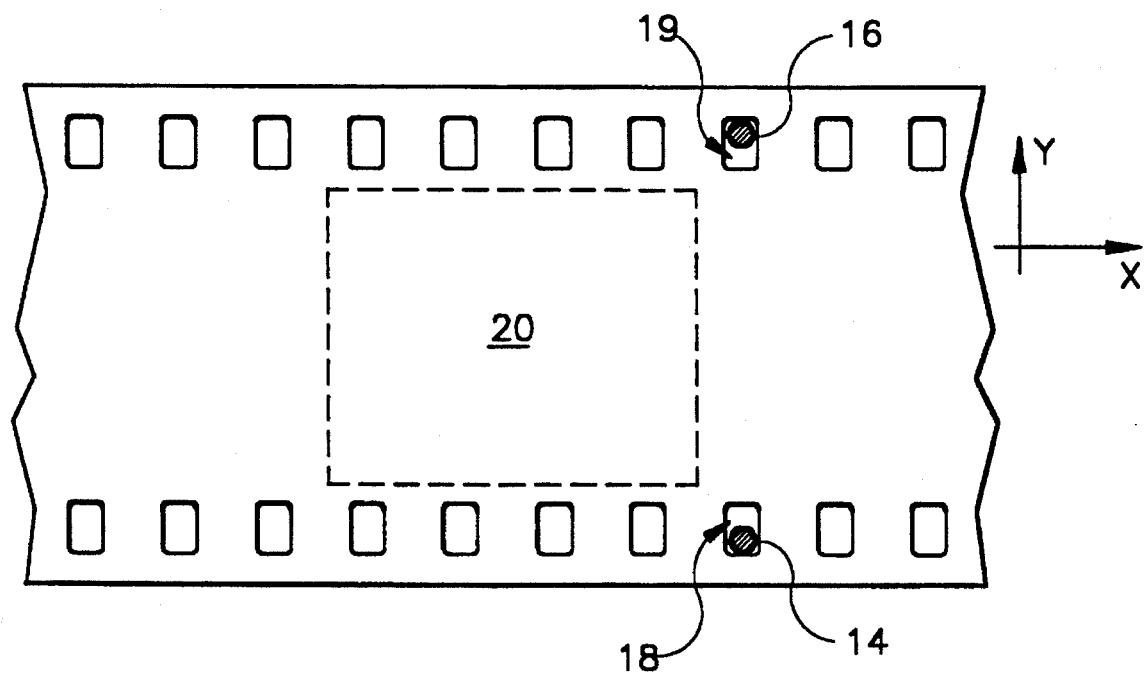
FIG. 5 shows the positions of the pins R1 and R2 upon the completion of the Y motion of the R2 pin in the film perforation.

Initially, the two registration pins 14 and 16 enter their respective perforations 18 and 19 adjacent to the image area 20 to be positioned in the gate at a focal positioning location as shown in FIG. 3. The pins 14 and 16 are undersize relative to the perforation dimensions and their spacing is such that they can freely enter the perforations without scuffing or rubbing on the perforation edges. This is important because such scuffing and rubbing would result in wear of the pins 14 and 16 and possibly damage to the film 15. The direction of travel of the pins 14 and 16 as they enter their respective perforations 18 and 19 is radial (in the negative Z-direction). Once the pins have fully entered their perforations 18 and 19, their motion in the Z-direction stops. The position of the pin 14 in both the X- and Y-directions is fixed. The position of the pin 16 in the X-direction is fixed. Next, the pin 16 moves in the positive Y-direction to the position shown in FIG. 4. As the pin 16 moves in the positive Y-direction, it makes contact with the upper edge of its perforation. As the pin 16 continues to in the Y-direction, the film is carried with it until contact is made between the pin 14 and the lower edge of its perforation 18. This stops the motion of the pin 16 and the film in the Y-direction so that the upper side film is positioned along a reference line assuring proper positioning longitudinal of the film within the gate. The spring force which caused the pin 16 to move in the positive Y-direction is now being applied between the pin 14 and the lower edge of its perforation 18. This force is insuring that the lower edge of the perforation 18 is securely nested against the pin 14, as shown in FIG. 5. Since the pin 14 is rigid in the Y-direction, it provides rigid, precise, repeatable constraint to the film in the Y-direction.

Figure 6:
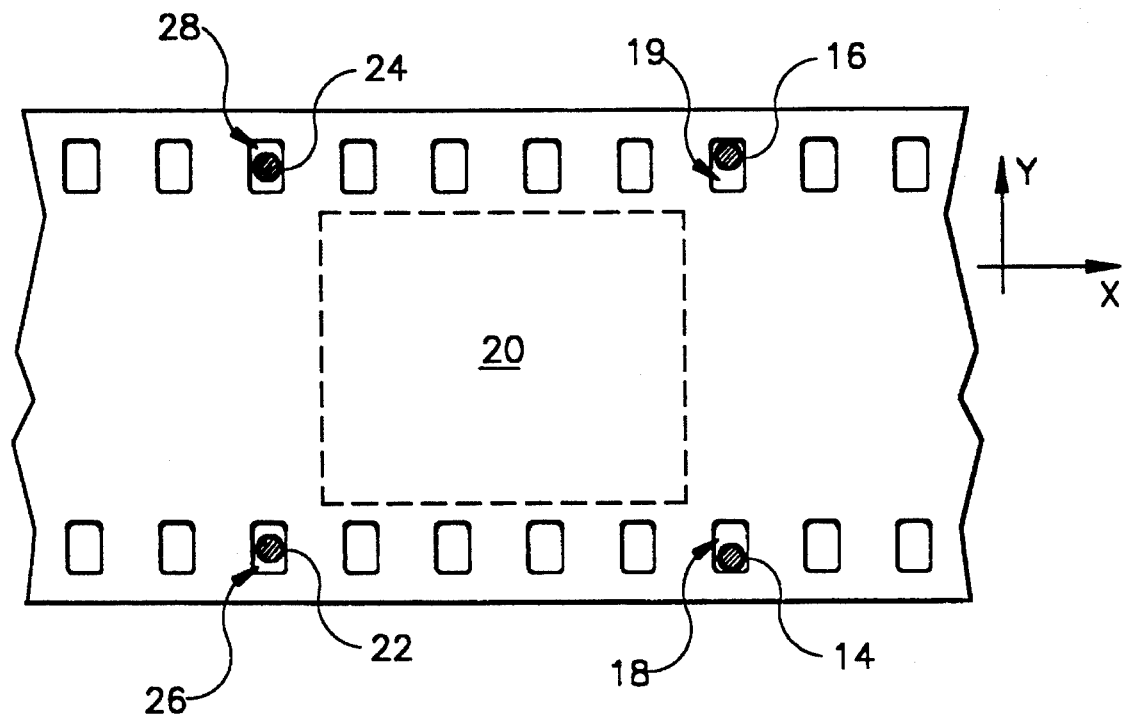
FIG. 6 shows the positions of pins S1 and S2 upon insertion into their perforations in the film.

Next, pins 22 and 24 enter their respective perforations 26 and 28 adjacent to the left-hand side of the image 20, as shown in FIG. 6. Like the registration pins 14 and 16, pins 22 and 24 are also undersize relative to the perforations 26 and 28 and spaced apart so that they may enter the perforations without scuffing or rubbing on the edges of the perforations. Once pins 22 and 24 have fully entered perforations 26 and 28, their radial direction motion (in the minus Z-direction) stops and they immediately begin moving in the minus X-direction under the influence of springs. As pins 22 and 24 move in the minus X-direction, they first make contact with the left-hand side edge (left as the FIG. 6 is oriented) of their respective perforations 26 and 28, then cause the film to move in the minus X-direction. This motion stops when the pins 14 and 16, whose X positions are rigidly fixed, make contact with the right-hand side edges of their respective perforations 18 and 19 as shown in the drawings. The spring force which caused the pin 22 to move is now being applied between the pin 14 and the right-hand side edge of its perforation 18.

Similarly, the spring force which caused the pin 24 to move is now being applied between the pin 16 and the right-hand side edge of its perforation. Since both the pins 14 and 16 are rigidly fixed in the X-direction, these pins provide rigid, precise, repeatable registration to the film in the X-direction and rotational constraint about the Z-axis.

Figure 7:
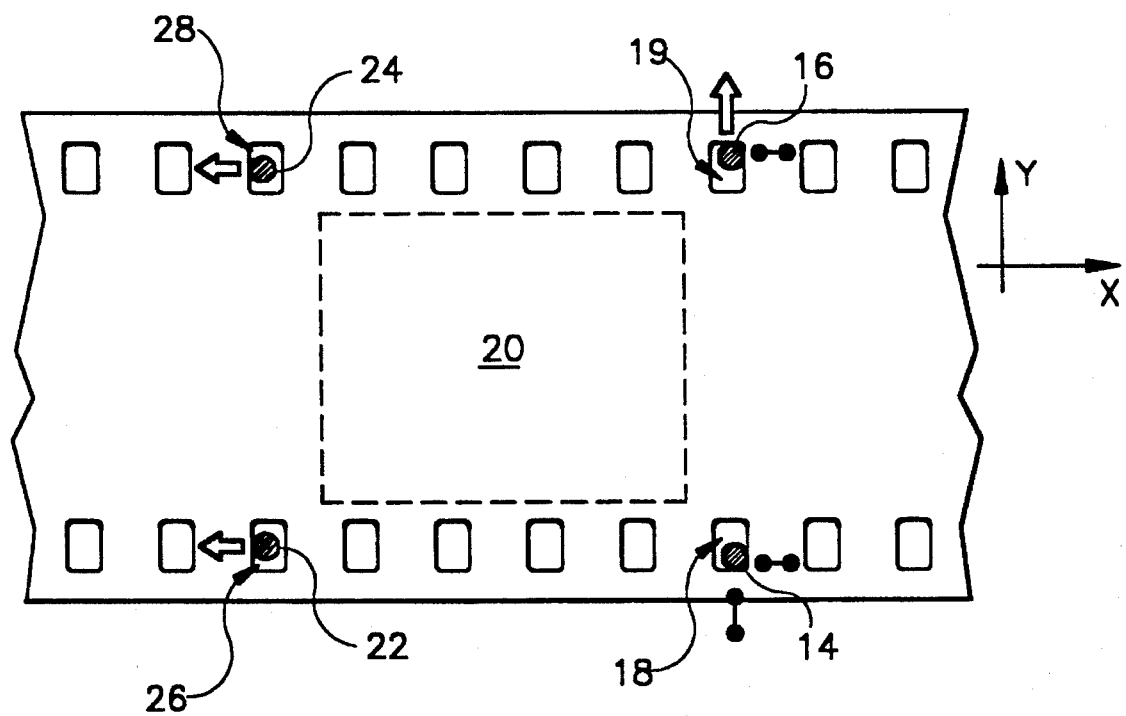
FIG. 7 shows the final positions of all four pins along with symbols which summarize the functions of each pin.

The final positions of all four pins of this invention are shown in FIG. 7. FIG. 7 also summarizes the purpose of each of the four pins in this pin registered film gate. Pin 14 provides X- and Y-constraints. Pin 16 provides rotational constraint about the Z-axis. Pin 16 also provides a Y-direction nesting force for pin 14. Pins 22 and 24 provide X-direction nesting forces for pins 14 and 16, respectively. In addition, the X-direction forces applied by pins 22 and 24 produce film tension which insures that the film will lay against the cylindrical gate surface. Thus, no clamp is needed.

Figure 8:
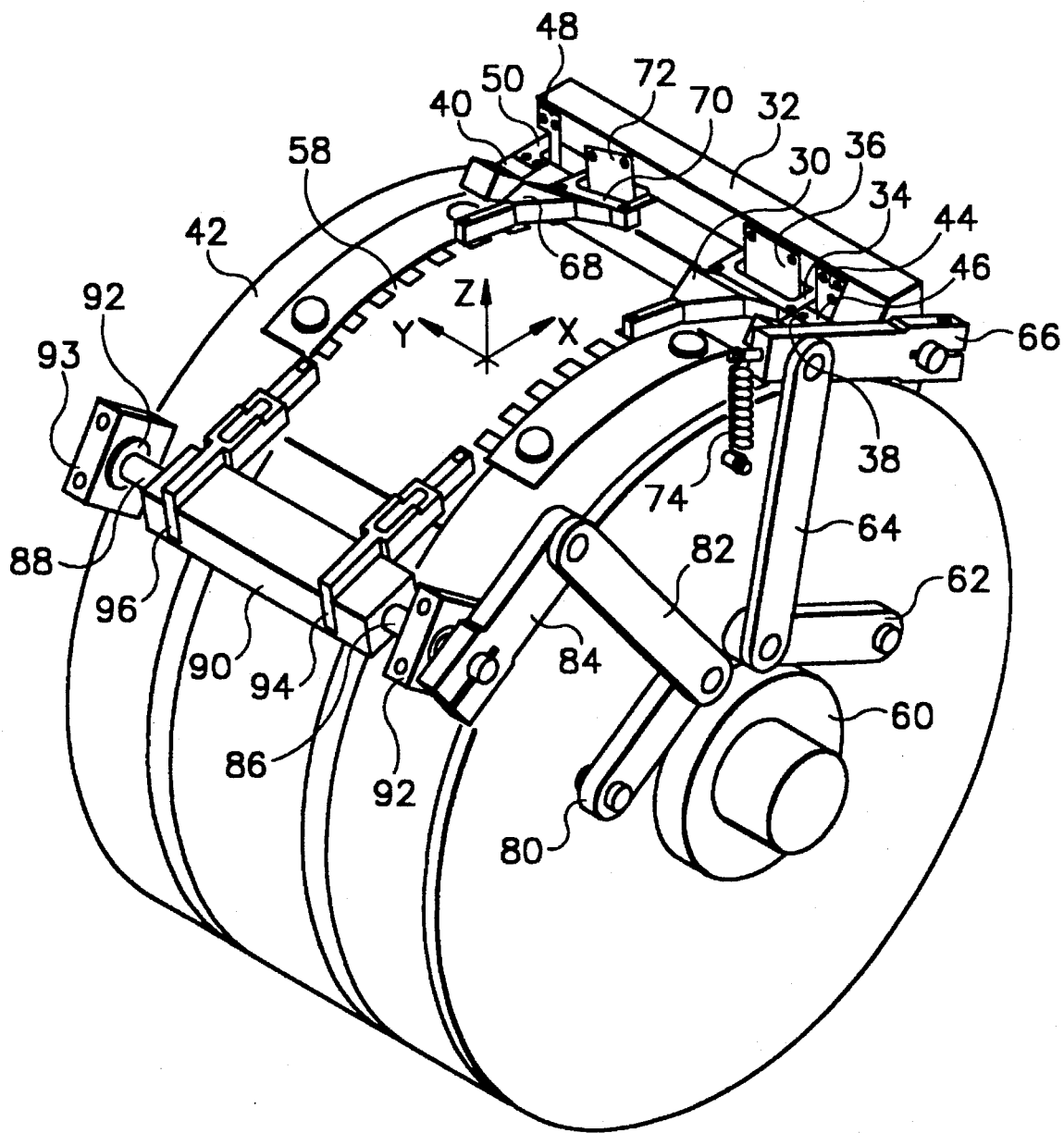
FIG. 8 shows a pictorial view of a mechanism which practices pin registration according to the present invention.
Figure 9:
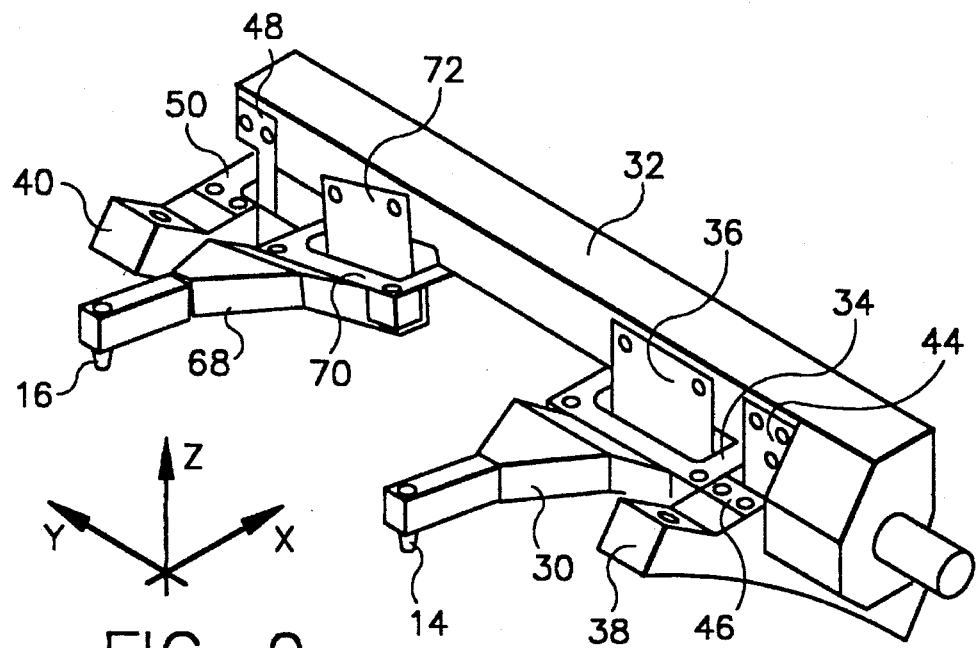
FIG. 9 shows, in a pictorial view, only those parts of the mechanism which are closely associated with the motions of pins R1 and R2.
Figure 10A:
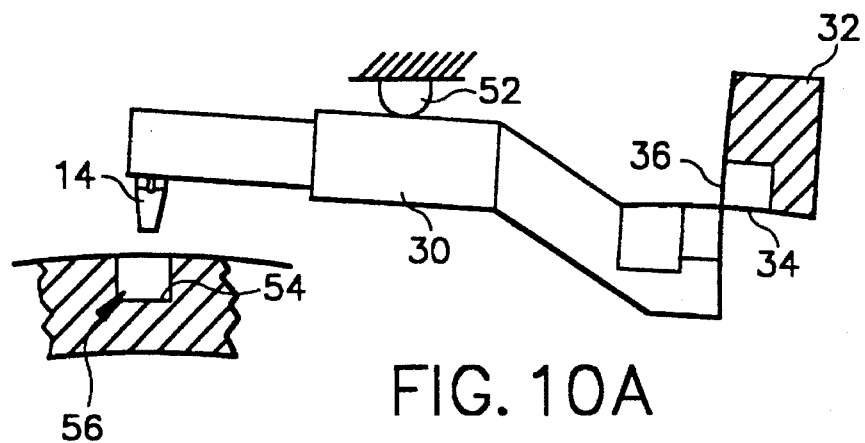
FIGS. 10a–c are views taken in the Y-direction showing the arm in each of three positions.
Figure 10B:
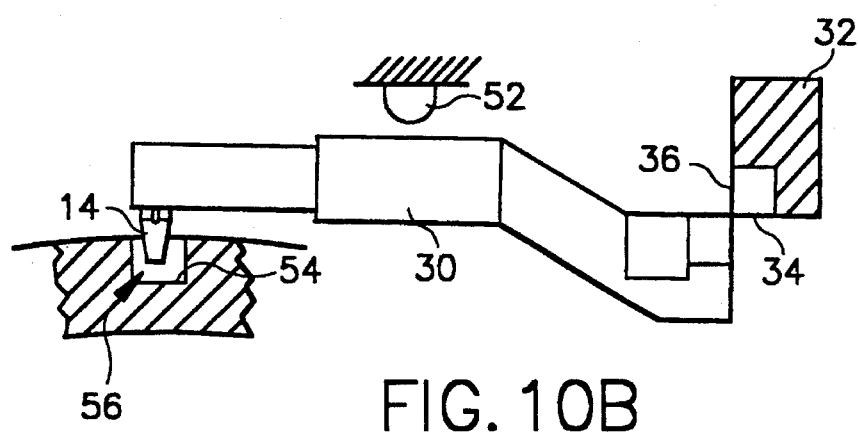
Figure 10C:
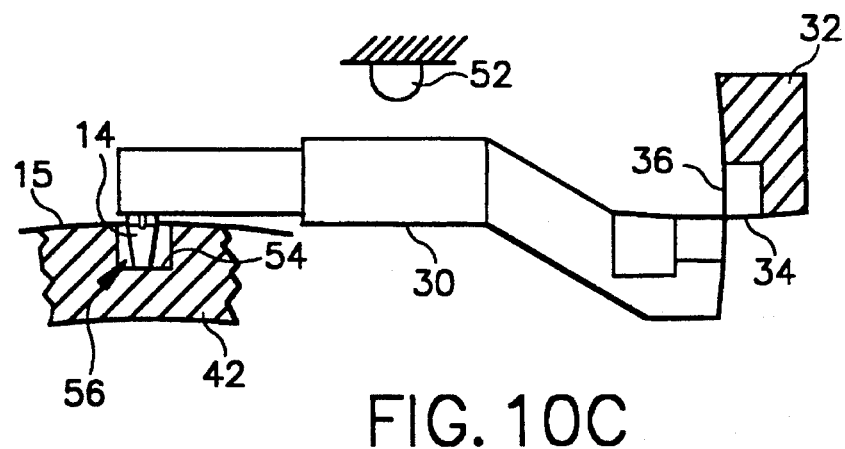

Referring to FIGS. 8 and 9, arm 30, to which pin 14 is mounted, is hingedly attached to bar 32 by means of crossed sheet flexures 34 and 36. The intersection of the planes of sheet flexures 34 and 36 defines the location of the hinge axis. In turn, bar 32 is hingedly attached to blocks 38 and 40 (which are rigidly attached to drum 42) by crossed flexure pair 44 and 46 and pair 48 and 50, respectively. The hinge axes defined by these two pairs are co-linear with the hinge axis defined by pair 34 and 36. Recalling that according to this invention, the pin 14 is required to undergo a radial motion in the negative Z-direction as it enters the perforation 18. This motion is accomplished by the counter-clockwise (CCW) rotation of bar 32 about its hinge axis, as shown in FIG. 10a–b. Referring now to FIG. 10a, showing the pin 14 in its fully withdrawn position, bar 32 is in its fully CW position, with flexures 34 and 36 somewhat bent, causing arm 30 to be held lightly against stop 52 with a small amount of force. (Stop 52 is not shown in FIGS. 8 and 9.) As the bar 32 begins to rotate CCW, flexures 34 and 36 are permitted to become straight and arm 30 begins to move away from stop 52, as shown in FIG. 10b. FIG. 10c shows arm 30 in its fully down position, with the end of pin 14 resting against the floor 54 of hole 56 in drum 42. Notice that flexures 34 and 36 are again bent, this time producing a small force of contact between pin 14 and floor 54. A small amount of clearance remains between arm 30 and film 15. This is important because if arm 30 were to bear against film 15, the resulting friction might impede the desired motion of the film 15 as it moves into proper registration with pins 14 and 16. To complete the explanation of the motion of pin 14, referring again to FIG. 8, it can clearly be seen that rotation of cam 60, through the combined action of rocker 62, link 64, and lever 66 will produce an oscillatory rotation of bar 32 about its axis which, in turn, produces the desired insertion and withdrawal of pin 14 relative to the film perforation 18.

Figure 11:
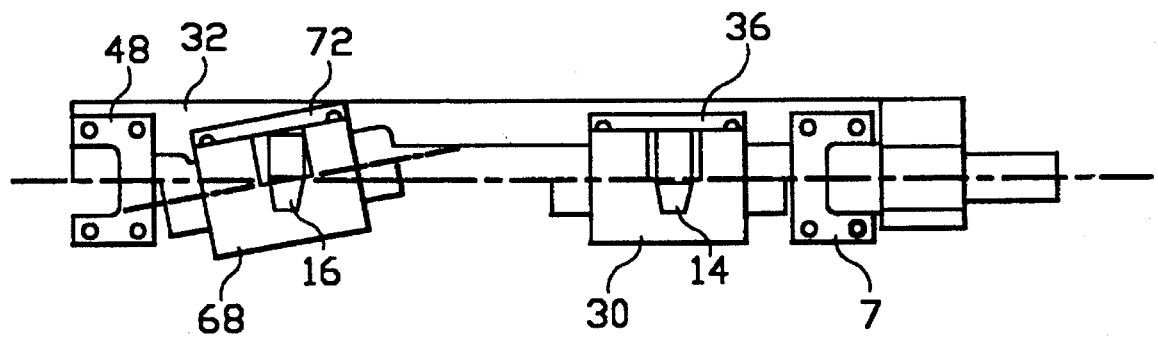
FIG. 11 is a view taken in the X-direction showing the inclination of the hinge axis of arm 22 in relation to that of bar 2.

Referring now to pin 16, it can be seen in FIGS. 8 and 9 that pin 16 is mounted in arm 68, which is hingedly attached to bar 32 by crossed flexures 70 and 72. The hinge axis of arm 68, defined by the intersection of the planes of flexures 70 and 72, is not co-linear with the hinge axis of bar 32. Both of these axes do, however, intersect and lie in a plane parallel to the Y-Z plane. In FIG. 11, notice that the intersection of the hinge axis of arm 68 and the hinge axis of bar 32 projects onto the intersection of the centerline of pin 16 and the film in this view. FIG. 11 also shows the inclination of the hinge axis of arm 68 relative to the axis of bar 32. This inclination is responsible for producing the compound motion which is required of the pin 16. The explanation for this motion goes as follows: arm 68, initially in its "up" position (pin 16 withdrawn) begins to descend in response to CCW rotation of bar 32. Flexures 70 and 72 are flat, in their free state. Downward motion of arm 68 stops when pin 16 makes contact with the floor of the hole provided for it in the drum 42. (Similar to floor 54 of hole 56 for pin 14.) As bar 32 continues its CCW rotation (under the influence of spring 74), arm 68 is forced to rotate about its axis which, because of its inclination, produces a $\theta_z$ component of rotation of arm 68, which results in the desired Y motion of pin 16. This unique geometry of the hinge axes results in exactly the prescribed situation for pin 16, namely: its X-position is rigidly fixed; it enters the perforation 19 from the positive Z-direction, then stops its Z-motion and moves in the positive Y-direction with a preset level of force (determined by spring 74).

Withdrawal of pins 14 and 16 happens in the reverse order of events encountered during insertion. Bar 32 begins to rotate CW and pin 16 begins moving in the minus Y-direction. This motion stops when flexure pair 70 and 72 reach their flat, free state. At the same time, flexure pair 34 and 36 also become flat. Continued CW rotation of bar 32 causes arm 30 and arm 68 to begin rotating CW with bar 32, causing pins 14 and 16 to be simultaneously withdrawn from their respective perforations 18 and 19. Once pins 14 and 16 are clear of the film 15, the arms come to rest against fixed stops 52. A small amount of additional CW rotation of bar 32 causes flexure pair 34 and 36 and pair 70 and 72 to become somewhat bent, producing a light force which holds arms 30 and 68 against their respective stops 52.

Referring now to the part of the mechanism which produces the desired motion of pins 22 and 24, it can be seen in FIG. 8 that rotation of cam 60, through the combined action of rocker 80, line 82 and lever 84, will produce an oscillatory motion of shaft 86. Shaft 86 and shaft 88, both rigidly attached to bar 90, are constrained to rotate in bearings 92, which are mounted in blocks 92, mounted to drum 42.

Figure 12:
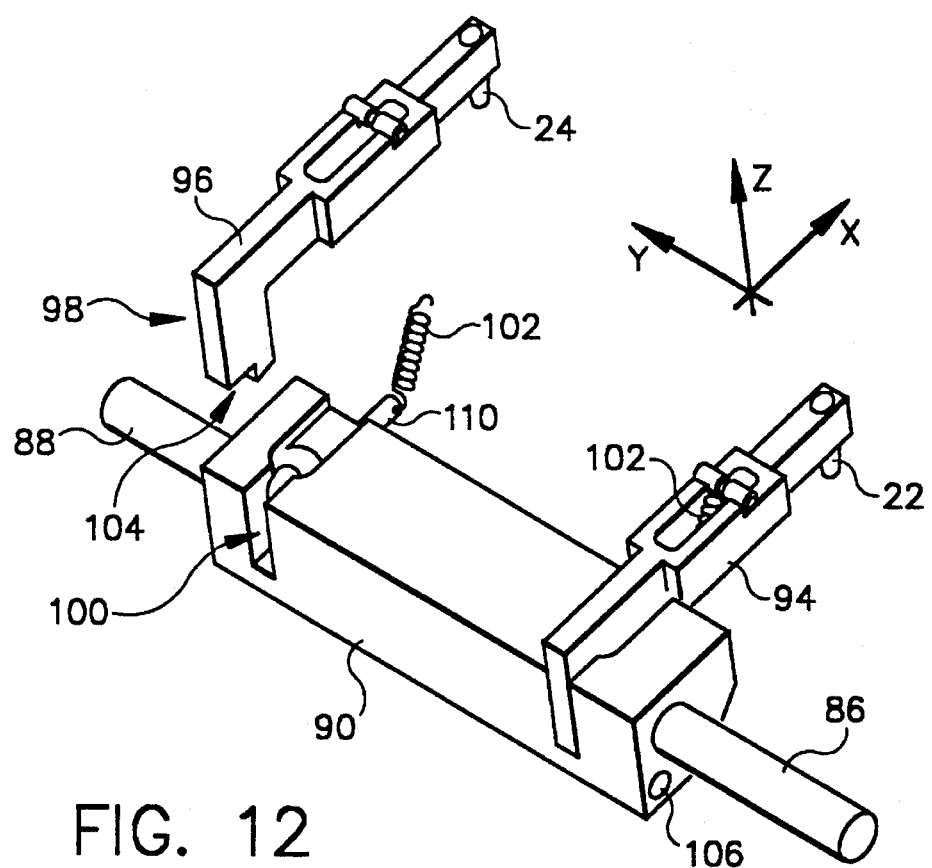
FIG. 12 is a partially exploded view of the mechanism which is closely associated with the motion of pins S1 and S2.
Figure 13:
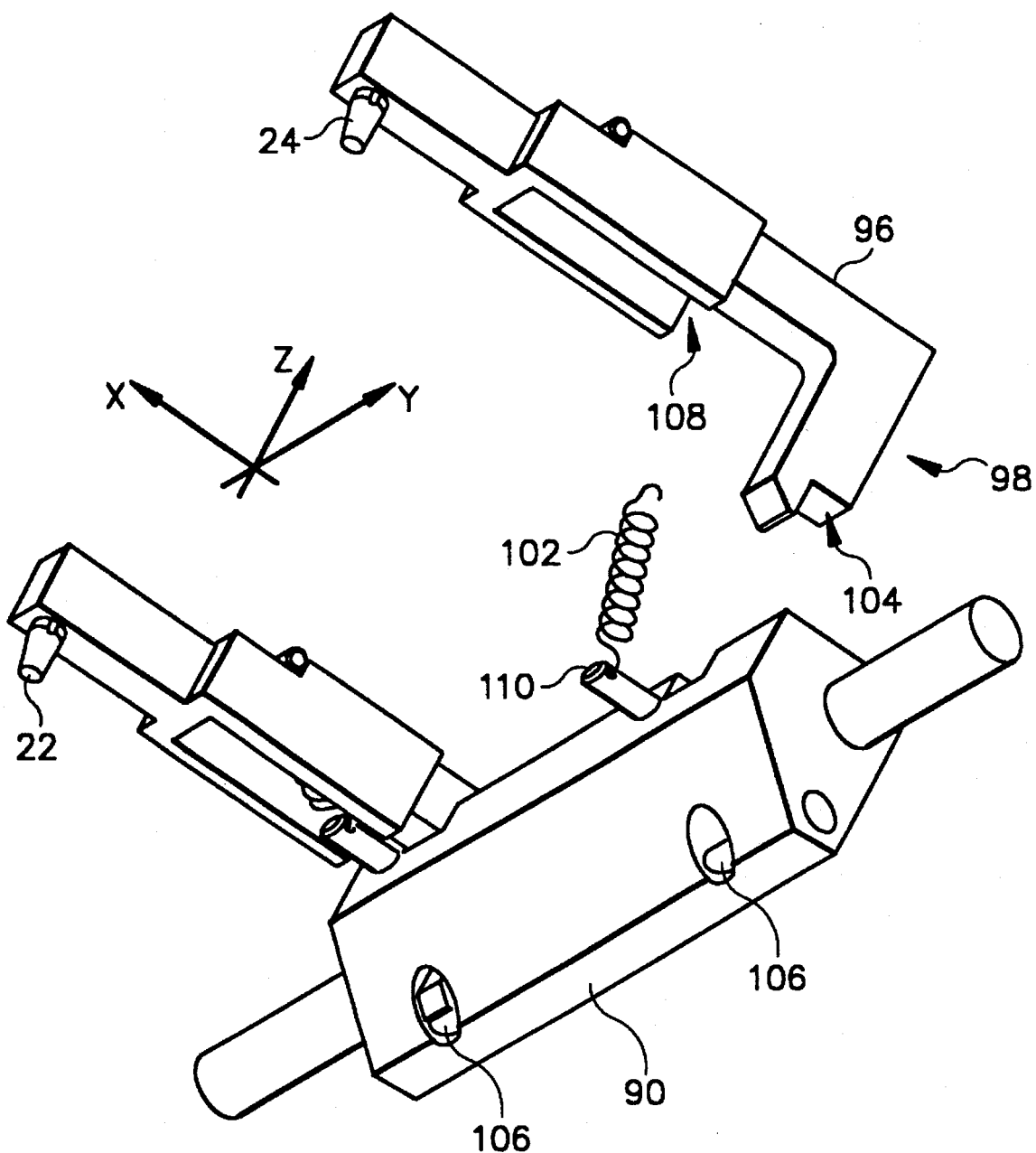
FIG. 13 shows an underside view of the same partially exploded mechanism shown in FIG. 12.

The connection between bar 90 and arm 94, which carries pin 22, is identical to the connection between bar 90 and arm 96, which carries pin 24. Thus, only the connection between bar 90 and arm 96 will be explicitly described. Referring to FIGS. 12, 13, and 14, rear portion 98 of arm 96 fits into slot 100 of bar 90 with only a small amount of clearance (a few mils), thus constraining Y and $\theta_y$ and $\theta_z$ motion of arm 96. Spring 102 applies the force needed to keep V-notch 104 seated against pin 106 and V-notch 108 seated against pin 110. The connection between bar 90 and each arm is thus seen to comprise exactly six constraints, so when bar 90 is in its maximum CCW position as shown in FIG. 14a, the positions of arms 94 and 96 are determined by those constraints.

Because pins 22 and 24 are required to undergo a compound motion, consisting of first a negative Z motion where the pins enter their perforations, followed by a motion in the negative X-direction.

Figure 14A:
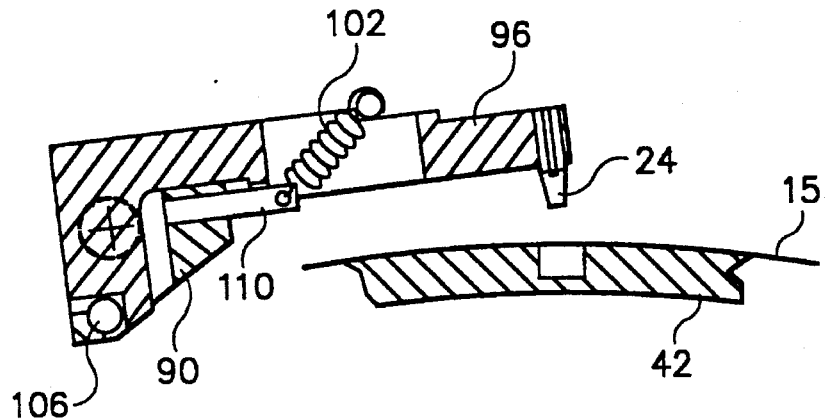
FIGS. 14a–c are a views taken in the Y-direction partially in section showing bar 30 and arm 35 in each of three positions.
Figure 14B:
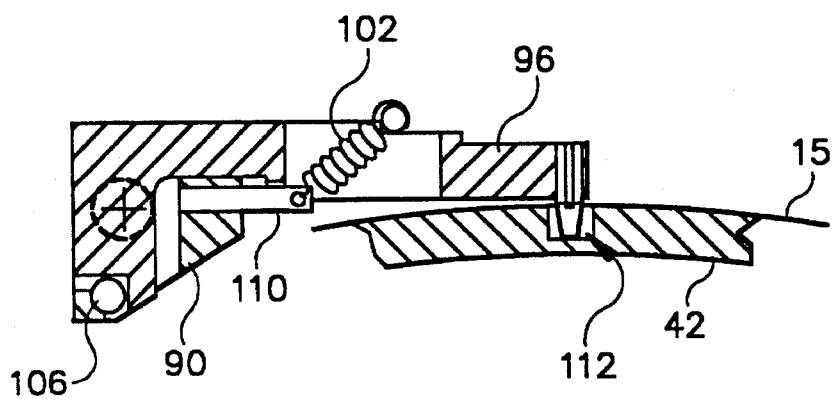
Figure 14C:
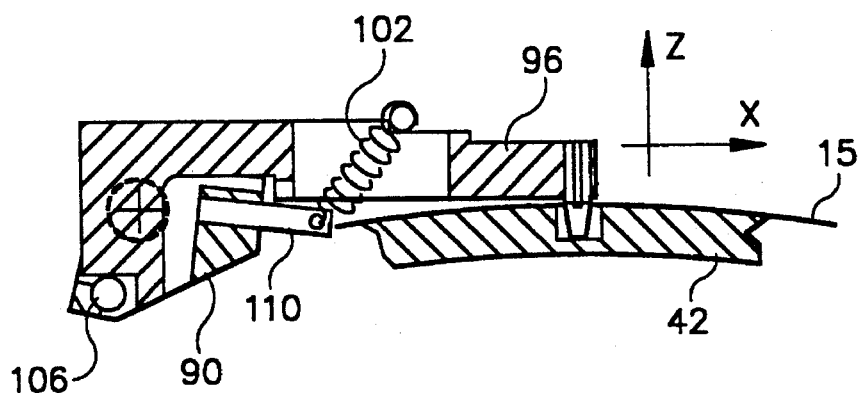

The first component of this motion is accomplished as bar 90 rotates CW from the position shown in FIG. 14a to that shown in FIG. 14b. The Z-motion of pins 22 and 24 stops when the encounter floor 112 of their respective perforations 26. Continued rotation of bar 90 to the position shown in FIG. 14c results in pin 110 moving out of contact with V-notch 108 and pin 106 moving to the left, in the negative X-direction. As pin 106 moves in the negative X-direction, spring 102 pulls arm 96 in the negative X-direction, too. This negative X-direction motion of pins 22 and 24 is the second component of their required motion. In practice, the two components of this motion occur in a smooth, continuous sequence.

Figure 15:
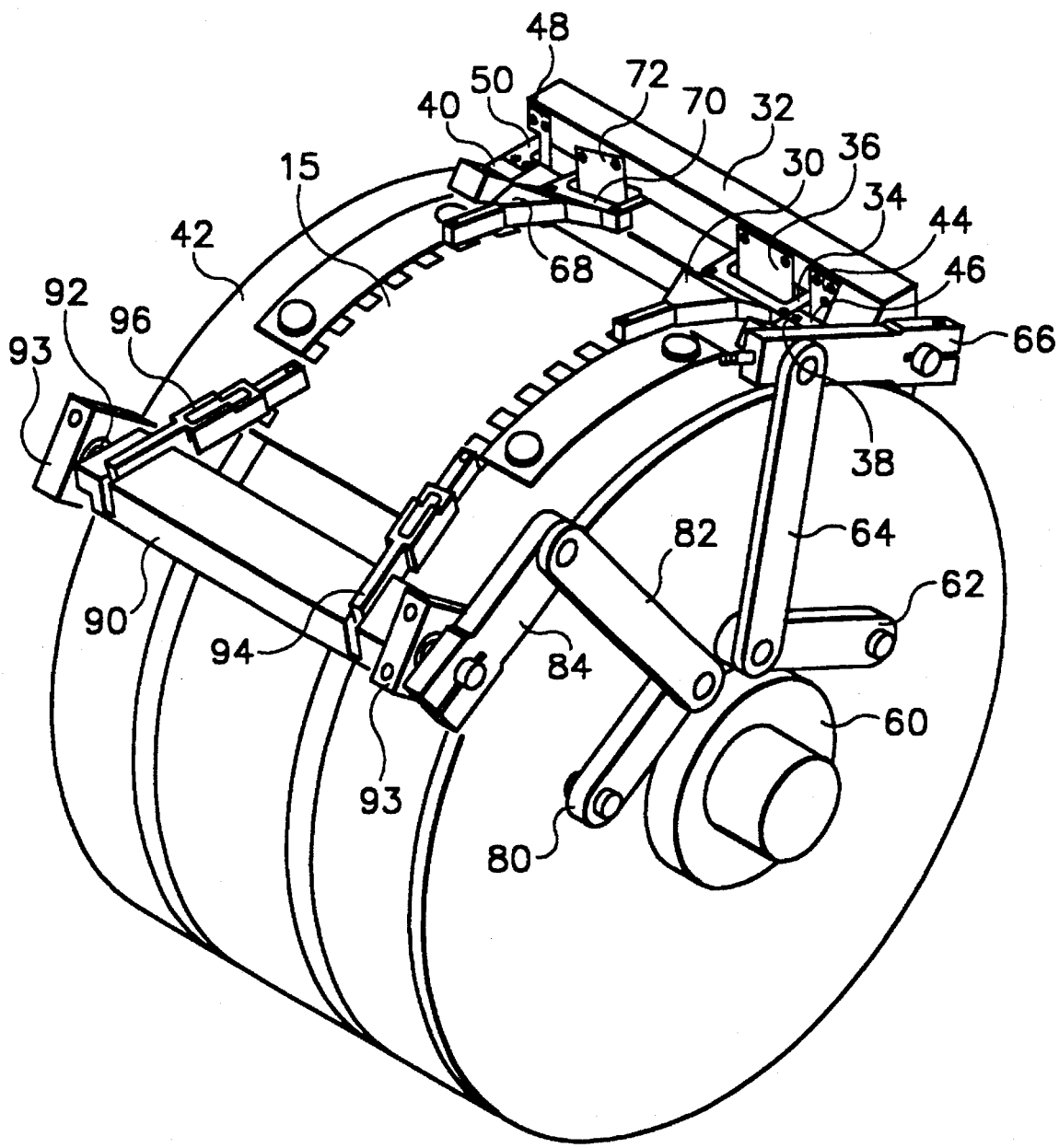
FIG. 15 shows a pictorial view of a second embodiment having arms 34 and 35 positioned at an oblique angle to the longitudinal direction of the filmstrip.

As an improvement, bar 90 was re-designed so that instead of holding arms 34 and 35 parallel to each other, as shown in FIGS. 12 and 13, they are now oriented obliquely to each other as shown in FIG. 15. In this arrangement, pins 22 and 24 exert oblique forces on the film, providing not only the negative X-component whose purpose has been heretofore described in detail, but also a Y-component of force between pins 22 and 24. This Y direction force between pins 22 and 24 applies Y direction tension to the film in the region between pins 22 and 24. This tension ensures that even curled film will be held tightly against the gate surface. This mechanism was also built and produced the desired effect on the film.

This invention has been described in detail with particular reference to the preferred embodiment thereof, but it will be understood that variations and modifications can be effected within the spirit and scope of the invention.

I claim:

1. A film registration assembly for positioning an image on a filmstrip within a film gate, said filmstrip having edge perforations along both edges of the filmstrip, said assembly comprising:

first pair of pins movable between an inactive position and an active position wherein said pins each enter one perforation on each edge of the filmstrip and a first pin of said first pair is fixed while in its active position, to provide a reference for the filmstrip when the filmstrip engages said first pin of said first pair;

a second pair of pins movable between an inactive position and an active position wherein said second pair of pins engage edge perforations on each edge of the filmstrip;

a first force applying means associated with said first pair of pins for applying a force to a second pin of said first pair of pins, on the opposite edge of the filmstrip from said first pin of said first pair, in a direction lateral to said filmstrip such that the outermost edge of the perforation engages said first pin of said first pair; and a second force applying means associated with said second pair of pins for applying a force to at least one pin of said second pair of pins, in a direction longitudinal to the filmstrip, and away from said first pair of pins.

2. The film registration assembly as set forth in claim 1 further comprising arm members for supporting each pin of said first pair of pins.

3. The film registration assembly as set forth in claim 2 further comprising arm members for supporting each pin of said second pair of pins.

4. The film registration assembly as set forth in claim 3 wherein the arm members for the first pair of pins are parallel to each other and the arm members for the second pair of pins are parallel to each other.

5. The film registration assembly as set forth in claim 3 wherein the arm members of the first pair of pins are parallel to each other.

6. The film registration assembly as set forth in claim 5 wherein the arm members of the second pair of pins are at an oblique angle to the longitudinal direction of the filmstrip.

7. A film registration assembly for positioning longitudinally successive, uniform rectangular image frames within a film gate, said image frames are on a strip of film bounded between a pair of parallel rows of equidistant, uniform rectangular edge perforations of common cross-sectional size, each perforation in one row being transversely aligned with a corresponding perforation in the other row, said assembly comprising:

an arcuate film track, the surface of which forms said film gate for positioning an image frame of the filmstrip within said gate;

registration means including first and second pins disposed perpendicular to the filmstrip with said first pin being fixed to provide a reference to locate said film on said perforation; third and fourth pins positioned along said film track from said first and second pins;

means for moving said second pin in a lateral direction away from said first pin and positioning said film with respect to said first pin, also means for moving said third and fourth pins in a longitudinal direction to locate said perforation in said filmstrip with respect to said first pin in the longitudinal direction.

8. A film registration assembly as set forth in claim 7 wherein the first, second, third and fourth pins are of a smaller cross-sectional size than the film perforations.

9. A film registration assembly for positioning an image on a filmstrip within a film gate, said filmstrip having edge perforations along both edges of the filmstrip, said assembly comprising:

a first pair of pins movable between an inactive position and an active position, wherein said pins each enter one perforation on each edge of the filmstrip and a first pin of said first pair of pins is fixed while said first pin is in said active position to provide a reference for the filmstrip when the filmstrip engages said first pin;

a second pair of pins movable between an inactive position and an active position wherein each pin of second pair of pins engage edge perforations on each edge of the filmstrip;

a first means for applying a force to a second pin of said first pair of pins on the opposite edge of the filmstrip from said first pin in a direction lateral to said filmstrip such that the outermost edge of the perforation engages said first pin; and a second means for applying a force to at least one pin of said second pair of pins in a direction longitudinal to the filmstrip and away from said first pair of pins.

* * * * *